US007128957B2

(12) United States Patent
Bratter

(10) Patent No.: US 7,128,957 B2
(45) Date of Patent: Oct. 31, 2006

(54) REPOSITIONABLE PAD OF TABS

(75) Inventor: Adam Bratter, Newport Coast, CA (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 10/231,842

(22) Filed: Aug. 28, 2002

(65) Prior Publication Data

US 2004/0040649 A1 Mar. 4, 2004

(51) Int. Cl.
*B32B 33/00* (2006.01)

(52) U.S. Cl. ......................... 428/40.1; 40/299; 40/359; 40/360; 40/641; 283/37; 283/38; 283/39; 283/41; 283/81; 428/41.8; 428/42.1; 428/42.2; 428/42.3; 428/192

(58) Field of Classification Search ............... 428/40.1, 428/41.8, 42.1, 42.2, 42.3, 192, 194; 283/81, 283/37, 38, 39, 41; 40/299, 359, 360, 641
See application file for complete search history.

(56) References Cited

U.S. PATENT DOCUMENTS 4,680,210 A 7/1987 Corcoran
5,227,209 A * 7/1993 Garland ...................... 428/42.1
5,971,340 A * 10/1999 Murphy ................. 248/346.01
5,989,667 A * 11/1999 Tayebi ........................ 428/40.1
6,132,831 A * 10/2000 Thomas-Cote ............... 428/43
6,159,329 A * 12/2000 Tschanz ...................... 428/40.1

FOREIGN PATENT DOCUMENTS

| | | | |
|---|---|---|---|
| EP | 0885752 A1 | | 12/1998 |
| FR | 2630373 | | 10/1989 |
| WO | WO-95/32097 | * | 11/1995 |
| WO | WO 98/17481 | | 4/1998 |

OTHER PUBLICATIONS

Product sample—Avery Write-On Tabs 16141, copyright notice dated 2002.

* cited by examiner

*Primary Examiner*—Nasser Ahmad
(74) *Attorney, Agent, or Firm*—Fulwider Patton LLP; Scott R. Hansen

(57) ABSTRACT

A pad of index tabs includes a plurality of sheets, each sheet comprising a front and a back, and an area of removable adhesive along a top edge of the back. The sheets are applied to one another at respective areas of removable adhesive to form a pad. Each sheet has a plurality of index tabs removably adhered thereto. The tabs are partially coated with removable adhesive and have an edge portion that is not coated with adhesive. Each of the tabs has on an edge thereof a writing surface.

10 Claims, 2 Drawing Sheets

REPOSITIONABLE PAD OF TABS

FIELD OF INVENTION

The present invention relates to index tabs, and more particularly to a pad of sheets that each have one or more removable index tabs thereon.

BACKGROUND OF THE INVENTION

Adhesively backed index tabs are known in the art. The tabs typically have a coating of removable or permanent pressure sensitive adhesive on the back, such that the tab may be placed on the edge of the page or other substrate. The tabs may be used, for example, to mark a page in a book. A tab may have a portion that extends beyond the edge of the page, to identify the page that is marked. The tab may have a writable portion, such that the user can write or print text and/or graphics.

Index tabs of this type are typically supplied on a sheet, from which the user may remove the index tabs as desired. The sheets are typically U.S. letter size or similar and are not always convenient to store due to the relatively large size. Alternatively the tabs may be supplied affixed to sheets of a pad. A sheet of tabs that is removed from a pad is often easily misplaced because it is thin. Alternatively, the tabs may be supplied in a dispenser, with the user pulling the tabs from the dispenser as needed. The dispensers are typically small and easily misplaced or somewhat bulky such that they cannot be conveniently kept where most needed.

INVENTION SUMMARY

According to one aspect of the present invention, a pad of index tabs includes a plurality of sheets, each sheet comprising an area of removable adhesive. The sheets are applied to one another at respective areas of removable adhesive to form a pad. Each sheet has at least one index tab removably affixed thereto.

The areas of removable adhesive may be on the back of the sheet. Each sheet may include a plurality of removable tabs, with the removable tabs adhered to the sheets. The removable tab may include a writing surface, with the tabs partially backed with adhesive. The writing surface may, for example, be paper. In another embodiment, the index tabs may include a polyester base and a paper writing area, the paper writing area being adhered to the polyester base.

The pad may be backed with a backing sheet. The adhesive area may be a strip of adhesive at a top edge of the sheet. The sheet may be a release liner coated on the front side thereof with a release coating. Optionally, the sheet may lack a release coating or may be transparent. The tab may be partially coated with adhesive, each said tab having an edge portion thereof that is not coated with adhesive.

According to another aspect of the present invention, a pad of index tabs includes a plurality of sheets, each sheet comprising a front and a back, and an area of removable adhesive along a top edge of the back. The sheets are applied to one another at respective areas of removable adhesive to form a pad. Each sheet has a plurality of index tabs removably adhered thereto. The tabs are partially coated with removable adhesive and have an edge portion that is not coated with adhesive. Each of the tabs has on an edge thereof a writing surface.

The invention includes various features and modifications that are apparent from a study of the Detailed Description, the Drawings, and the claims. Consequently, this Summary does not limit the scope of the invention.

DETAILED DESCRIPTION OF THE PREFERRED EMBODIMENTS

Figure 1:
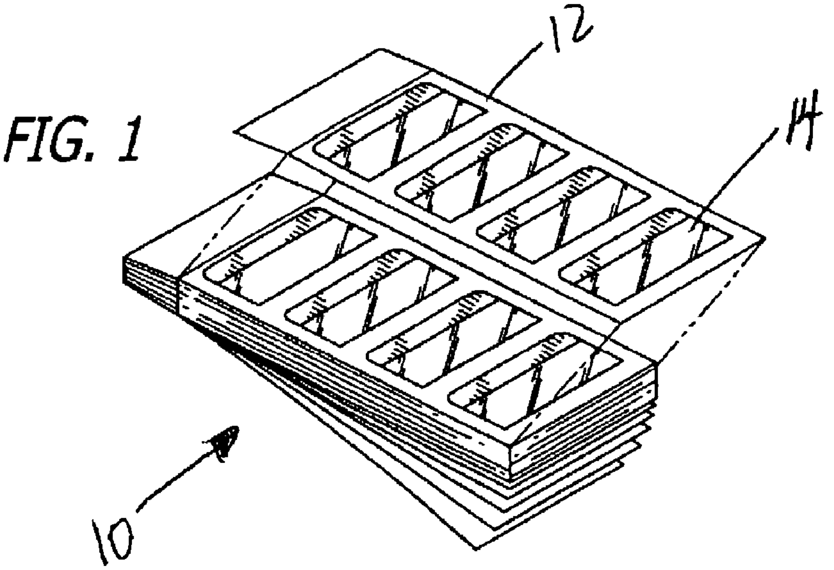
FIG. 1 is a front elevation of a pad of removable, index tab bearing sheets.

FIG. 1 illustrates a pad 10 of removable sheets such as 12 that each have a plurality of removable index tabs such as 14. The sheets 12 may be made from a variety of different materials, including release coated paper, paper with no release coating, or plastic, as long as the surface to which the index tabs are affixed is compatible with the adhesive used on the index tabs such that the index tabs are securely affixed to the sheets but can also be easily removed.

Figure 2:
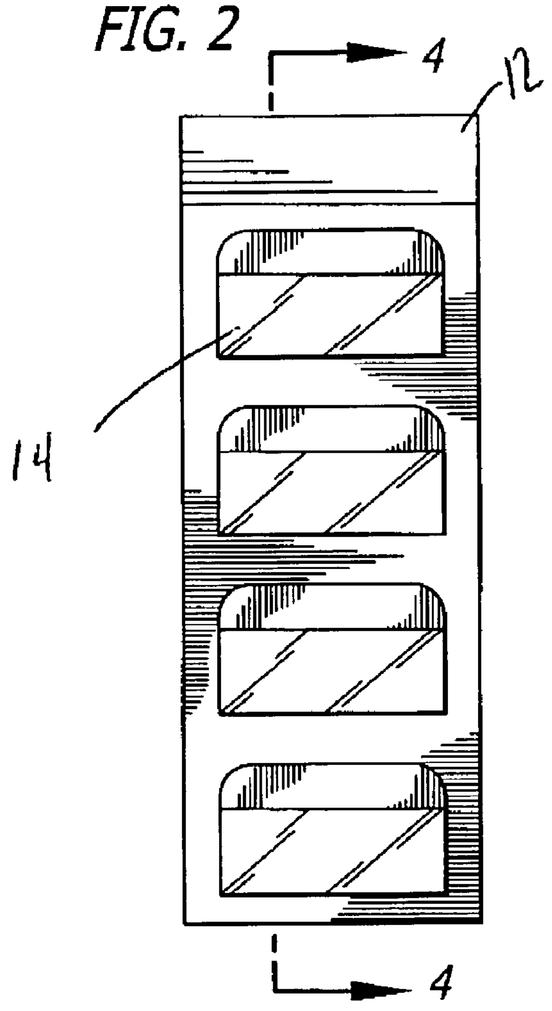
FIG. 2 is a front view of the top sheet of a pad of removable, index bearing sheets showing a single removable sheet.

FIG. 2 illustrates a front view of sheet 12. The sheet includes several removable tabs such as 14, which are removably mounted with adhesive onto the sheet 12. The tabs such as 14 may be made from a variety of different materials. In one embodiment, the tab 14 is made from a polyester base with a writable material such as paper on an upper edge thereof. In another embodiment, the tab 14 is made from a polyester base with a receptive coating on the entire face of the tab or on an upper edge thereof. In yet another embodiment, the tab 14 is made from a polyester base that has no writable surface but is pre-printed with a color and/or indicia. The tab 14 may also be made of a paper-based substrate.

Each sheet 12 has on the back thereof a stripe of adhesive 16. The stripe of adhesive 16 serves to hold the sheet 12 to the rest of the pad and also allows individual sheets to be affixed to another surface once they are separated from the pad. The preferred embodiment includes a single stripe of adhesive at the upper edge 16, although it may alternatively include a stripe along another edge, or an additional stripe of adhesive elsewhere on the sheet, such as at the center of the sheet. Various other adhesive arrangements may be utilized, such as printing the adhesive in a pattern, rather than in a stripe or other multiple location configurations.

Figure 3:
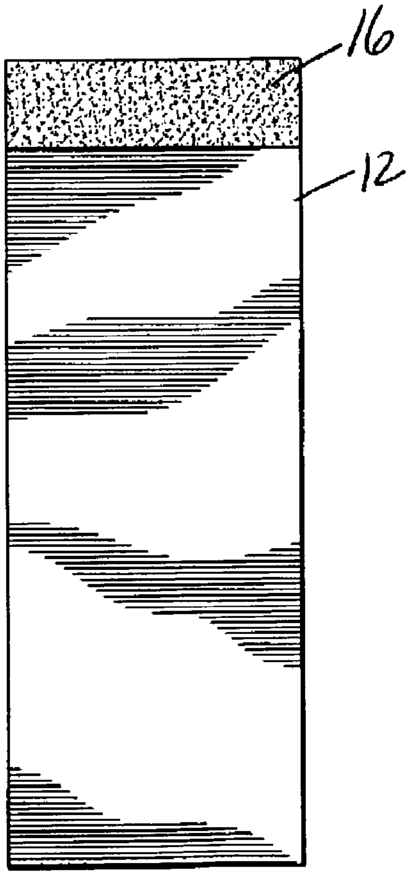
FIG. 3 is a rear view of a sheet, showing an adhesive band at the top of the sheet.

When release coated paper is used to form the sheet 12, the release coating is typically on the upper face on which the index tabs 14 reside. The back as shown in FIG. 3, typically is not coated with a release coating.

Figure 4:
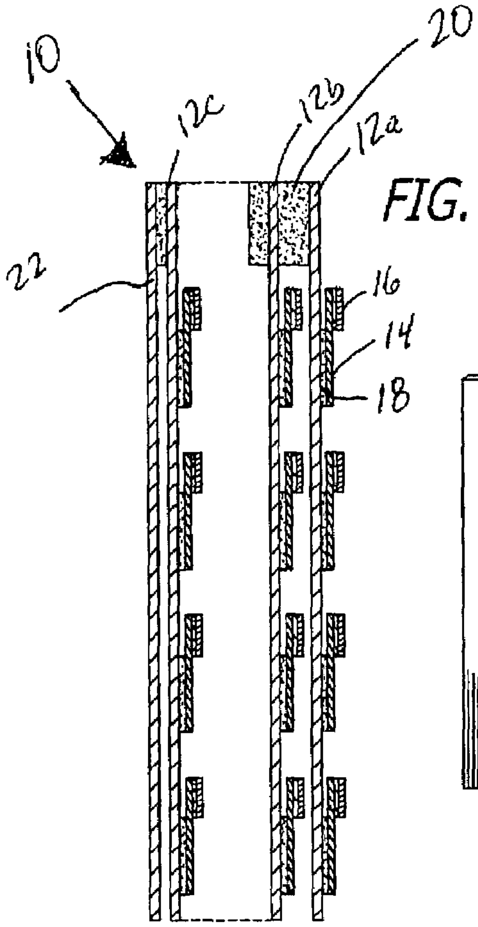
FIG. 4 is a cross-sectional view taken along line 4—4 of FIG. 2.

FIG. 4 shows several sheets 12A, 12B and 12C, each having a plurality of removable index tabs such as 14. Each tab 14 includes a writable surface 16, which may be made from paper or another writable or printable material, or which may be created as by the application of a receptive coating. Writable surface 16 may be adhered to the removable tab 14 by way of a permanent adhesive, or by other affixing means known in the art. The tab 14 is adhered to the sheet 12A by a layer of removable repositionable adhesive

18. Alternatively, the adhesive 18 may be a permanent adhesive. Removable, repositionable adhesives and permanent adhesives 18 are generally known in the art. When the tab 14 is removed from the sheet 12A, the adhesive layer 18 remains adhered to the removable tab 14.

A layer of pressure sensitive adhesive 20 serves to bond adjacent sheets 12 together. A backing sheet 22 may define the bottom of the pad. The backing sheet may be a sheet of paper, or may be a stiffer sheet material, such as card stock or card board.

Figure 5:
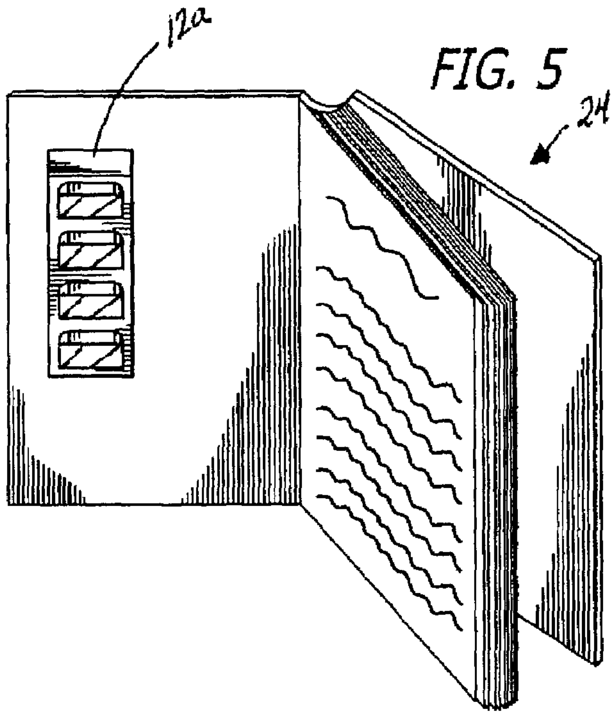
FIG. 5 illustrates the interior cover a book onto which a removable sheet has been adhered.
Figure 6:
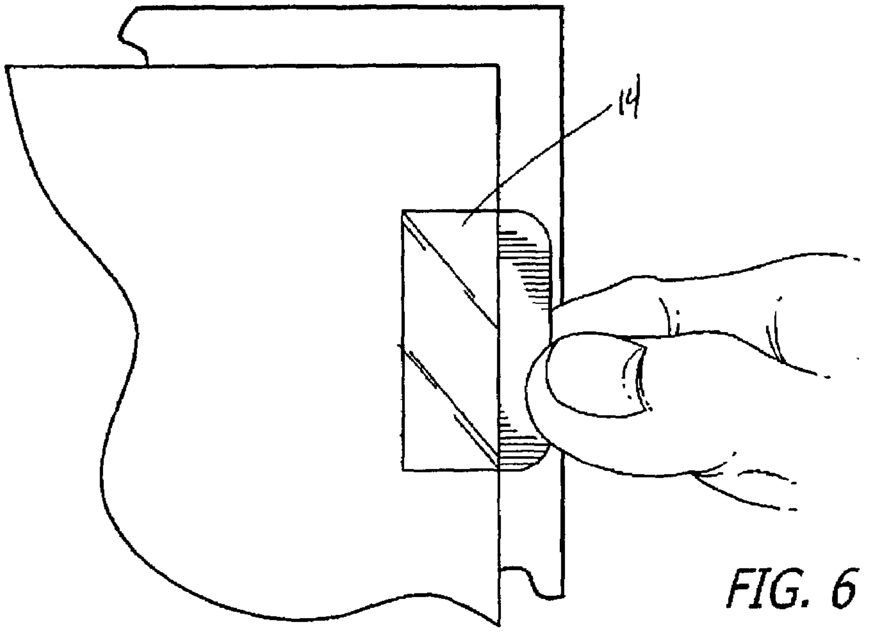
FIG. 6 illustrates an index tab applied to the edge of a book page.

The individual sheets, such as 12A, may be removed from the pad and adhered to other surfaces. For example, in FIG. 5, the sheet 12A has been adhered onto the interior of the front cover of a book 24. The user may then remove index tabs from the sheet 12A as desired. As illustrated in FIG. 6, for example, the removable tab may be placed at the edge of a sheet, to mark a particular page in a book of interest. As the adhesive backing the tab 14 is typically a repositionable, removable adhesive, the user may reposition the tab after initially applying it, as desired.

It is noted in FIG. 4, that the adhesive layer 18 that backs the tab 14, typically does not extend the entire back of the tab 14. Instead, the area of the tab corresponding to the underside of the writable portion 16, is typically not coated with adhesive, thereby creating a tab that a user may grasp for applying and removing the tab.

It is noted that various alternatives and modifications may be made within the scope of the invention. For example, the sheet 12 may be made with a transparent material, such as polyester. A sheet 12 may be coated with a release coating, such as silicone, although the sheet 12 may alternatively have a smooth surface that is sufficient to allow tab 14 to be removed therefrom. The writable surface 16 is typically a paper material that is adhered to tab 14. However, the writable surface 16 may be provided initially in the form of a tape that is applied to the tab 14 or by the application of a receptive coating as is known in the art. The base material of the tab 14 may be substantially transparent polymer material, such as transparent polyester, or it may alternatively be many of a variety of other materials, such as paper, various polymers, cardstock, or numerous other materials.

The sheets in FIGS. 1 and 2 are shown as strips of material having a single column of index tabs thereon. However, alternatively, the sheets may be provided in the form of multicolumn sheets, or may be provided as a strip having a row of tabs rather than a column. The number of index tabs per sheet may also vary. Or instead of index tabs, flags, labels, or other similar items may be affixed to the sheets. The sheets 12 may be a shape other than a rectangle, for example they may be rounded or curved for a particular decorative purposes, as desired. The stripe of adhesive 16 may be along a side edge rather than a top edge of the sheet, or may be on the bottom edge, or in the center of the sheet and not at an edge at all. That is, there are many locations on the back of the sheet 12 on which a stripe of adhesive 16 may be formed. The use of fully removable, repositionable adhesive is optional, and alternatively a permanent adhesive or other adhesive may be used. Numerous other variations may be made within the scope of the invention. Consequently, the invention is not limited by what is disclosed in the detail description herein.

As a further alternative, the index tabs, flags, labels or other items affixed to the sheets may be color coded or otherwise provided in a variety of colors. For example, the writable surfaces of the index tabs may be colored, with each tab having a unique color.

While the specification describes particular embodiments of the present invention, those of ordinary skill can devise variations of the present invention without departing from the inventive concept.

I claim:

1. A pad of index tabs that are removably applied to sheets, the sheets being removably adhered to one another to form a pad comprising:

a plurality of sheets, each sheet comprising an area of removable adhesive;

said sheets being adhered to one another at respective areas of removable adhesive to form a pad;

each sheet in the pad having at least one index tab removably affixed thereon, wherein each sheet is removable from said pad, with removable adhesive remaining on said sheet after removal, and wherein said respective areas of removable adhesive make said sheets adherable to another surface after removal from said pad;

wherein said index tabs comprise a polyester base and a paper writing area, the paper writing area being adhered to the polyester base to form a writable index tab portion.

2. A pad of index tabs as defined in claim 1, wherein each sheet comprises a front and a back, said areas of removable adhesive being on the back.

3. A pad of index tabs as defined in claim 1, wherein each sheet includes a plurality of removable tabs.

4. A pad of index tabs as defined in claim 3, wherein said removable tabs are adhered to the sheets.

5. A pad of index tabs as defined in claim 1, wherein said tabs are partially backed with adhesive.

6. A pad of index tabs as defined in claim 1, wherein the pad further comprises a backing.

7. A pad of index tabs as defined in claim 1, wherein said adhesive area comprises a strip of adhesive at a top edge of the sheet.

8. A pad of index tabs as defined in claim 1, wherein said sheets are fully coated on the front side thereof with a release coating.

9. A pad of index tabs as defined in claim 1, wherein said sheet is transparent.

10. A pad of index tabs as defined in claim 1, wherein said tab is partially coated with adhesive, each said tab having an edge portion thereof that is not coated with adhesive.

* * * * *